FIG. I

INVENTORS
HEINZ JOSEPH GERBER
DAVID JOPSON LOGAN

BY McCormick, Paulding & Huber
ATTORNEYS

Oct. 14, 1969  H. J. GERBER ET AL  3,473,009
X-Y PLOTTER
Original Filed Oct. 4, 1962

United States Patent Office 3,473,009
Patented Oct. 14, 1969

3,473,009
X-Y PLOTTER
Heinz Joseph Gerber, West Hartford, and David J. Logan, Glastonbury, Conn., assignor to The Gerber Scientific Instrument Company, Hartford, Conn., a corporation of Connecticut
Original application Oct. 4, 1962, Ser. No. 228,289, now Patent No. 3,293,651, dated Dec. 20, 1966. Divided and this application Oct. 1, 1965, Ser. No. 492,133
Int. Cl. G06f 15/20
U.S. Cl. 235—151                                    4 Claims

ABSTRACT OF THE DISCLOSURE

In an X-Y plotter the pen or other marking instrument is driven in both coordinate directions at a speed dependent on the magnitude of a digital error signal representing the actual displacement of the instrument from a desired end point. A plurality of clutches, each of which when energized causes movement of the instrument at a different speed, are controlled by assigning to each clutch differents bits of the digital error signal register, in groups of decreasing significance, so that as the magnitude of the error signal decreases a different clutch is energized as the most significant bit of the error signal shifts from one group to another.

---

This application is a division of application Ser. No. 228,289, filed Oct. 4, 1962 now U.S. Patent No. 3,293,651.

This invention relates to devices referred to as X-Y plotters for recording or plotting two dimensional data on a rectangular coordinate system and deals more particularly with a novel drive means for positioning the recording or printing head of such a device.

The general object of this invention is to provide in a plotter of the type having one or more movable carriages, a drive means for each carriage whereby it is driven at a speed dependent on its displacement from the point to be plotted and wherein the speed of the carriage decreases as it approaches, such point so that the carriage when it reaches the point has little momentum and may be stopped at the desired point with little or no overshoot.

Other objects and advantages of the invention will be apparent from the following description and from the drawings forming a part hereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
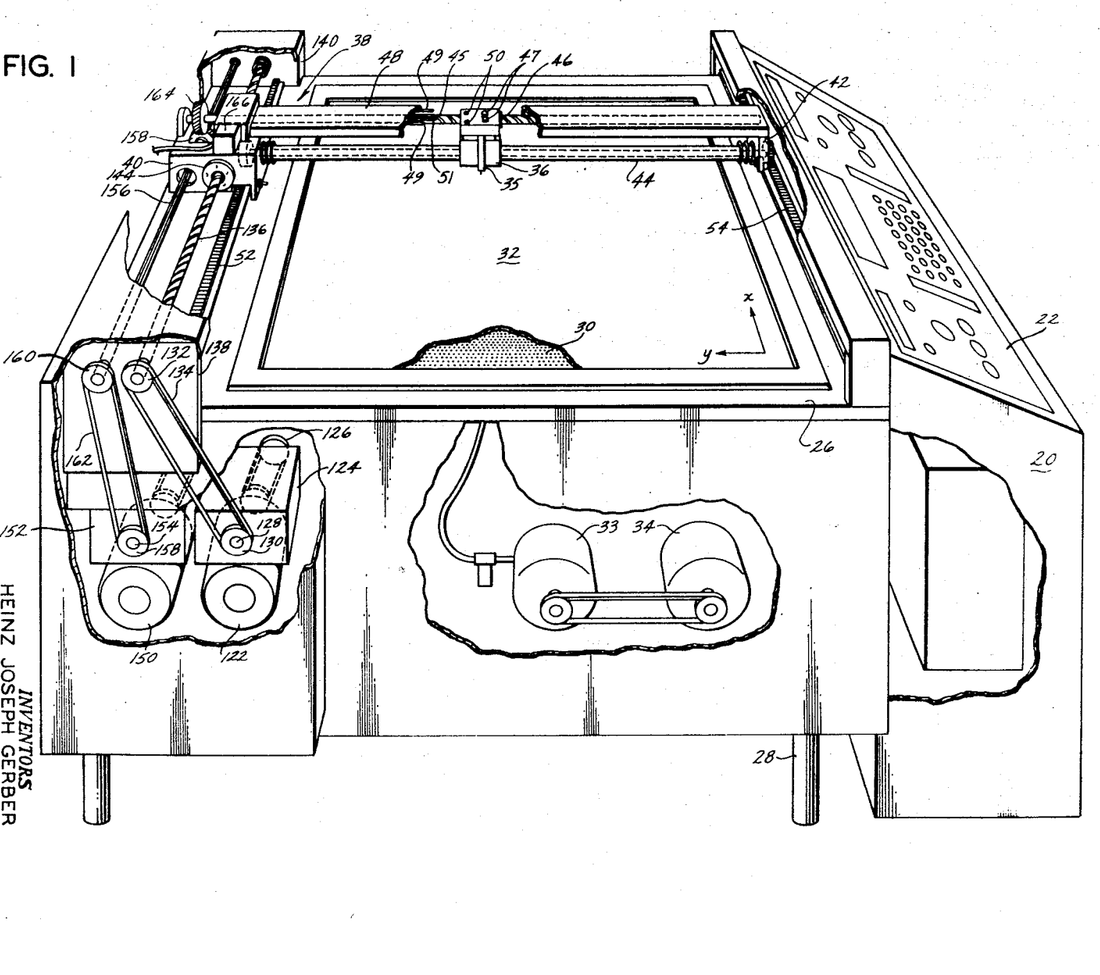
FIG. 1 is a perspective view of an X-Y plotter embodying the present invention, various parts of the plotter being shown broken away to reveal the structure of other parts.
Figure 2:
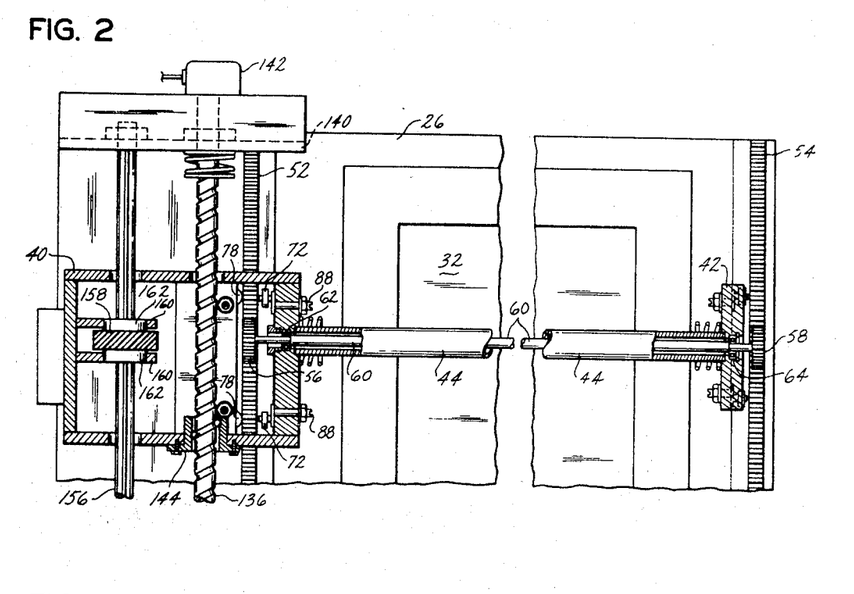
FIG. 2 is an enlarged fragmentary plan view of the plotter shown in FIG. 1.
Figure 3:
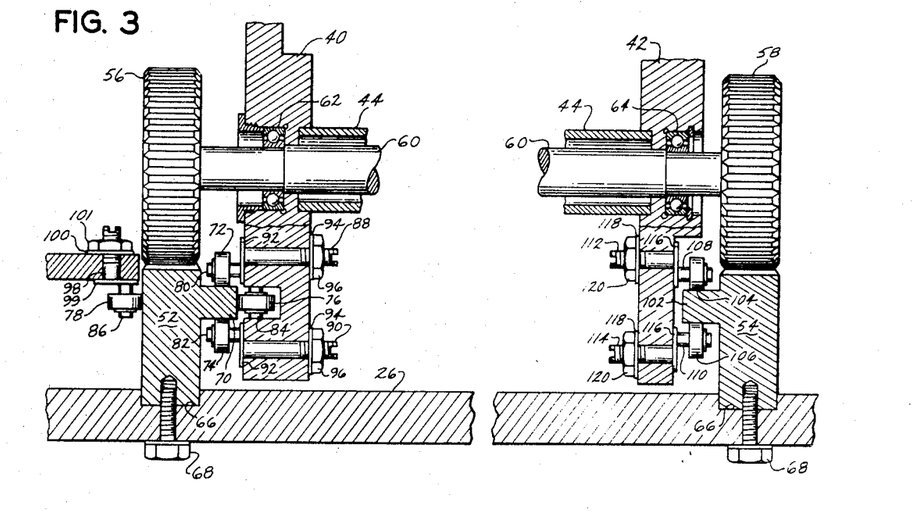
FIG. 3 is a still further enlarged fragmentary vertical sectional view taken on the line 3—3 of FIG. 2.

GENERAL ORGANIZATION OF PLOTTER—
FIGS. 1, 2 AND 3

The general construction of an X-Y plotter embodying the present invention is illustrated in FIG. 1. Referring to this figure, the illustrated plotter includes a control console 20 located at the right side of the plotter and containing electronic circuitry and the like for controlling the operation of the recording or printing head, the drive motors and other parts of the plotter hereinafter described. The sloping top of the console comprises a control panel 22 which includes all necessary switches, indicator lights and the like required for normal operation of the device. Information as to the coordinates of points to be plotted may be introduced manually through a keyboard or the like located on the control panel 22 or by means, such as a punched tape reader, for retrieving information from a prerecorded source.

Immediately adjacent and to the left of the control console 20 is the main body of the plotter which in the illustrated case is in the general form of a table and includes a horizontal base member 26 supported by a suitable framework indicated at 28. The base member 26 provides an upwardly facing plotting surface 30 having associated therewith a vacuum hold down system whereby a chart sheet 32 or the like placed on the surface is held thereto by a vacuum applied to the undersurface of the sheet by means including a vacuum pump 33 and motor 34 located below the base member 26. This, however, is not important to the invention and other means of holding the chart sheet to the plotting surface may be used. The horizontal arrangement of the base member and plotting surface is also not important and both may be oriented vertically or inclined to the horizontal without departing from the invention. For convenience, the X and Y directions in FIG. 1 are taken to be as indicated by the arrows appearing at the front right hand corner of the plotting surface.

The desired points are plotted on the chart sheet 32 by means of a recording or printing head 35 fixed to a carriage 36, referred to as the Y carriage, supported for movement in the Y direction relative to the plotting surface 30. The means for so supporting the Y carriage constitutes a second carriage, indicated generally at 38 and referred to as the X carriage, which latter carriage spans the plotting surface 30 and is supported for movement relative to the plotting surface in the X direction. The recording head 35 is therefore movable to any point on the plotting surface 30 by a combined movement of the Y carriage in the Y direction and the X carriage in the X direction. It should also be noted that instead of a printing or recording mechanism the first or Y carriage could be equipped with a tool such as a drill, router or scribe and used to drill, cut or otherwise machine parts such as for example printed circuit boards fixed to the table 26 or otherwise fixedly supported relative to the device in place of the illustrated chart sheet 32.

Referring to FIGS. 1, 2 and 3, the X carriage 38 comprises a drive housing 40 located on the left of the plotting surface 30, an end block 42 located on the right side of the plotting surface 30 and a bridge means extending between the housing 40 and the block 42 for guiding and supporting the Y carriage 36 for movement in the Y direction. The latter bridge means for supporting and guiding the Y carriage may take various different forms, but preferably and as shown it comprises a hollow cylindrical tube 44 to which the Y carriage in slidably mounted by suitable bushings or the like. Also extending between the end blocks 40 and 42 is a lead screw 45 which engages a nut 46, preferably of the recirculating ball type, fixed to the Y carriage 36 so that the latter carriage is moved longitudinally of the guide tube 44 in response to rotation of the lead screw 45 in one direction or another about its longitudinal axis, the lead screw 45 being supported rotatably at both ends by the housing 40 and block 42. The lead screw 45 also prevents the carriage 36 from rotating or moving angularly relative to the tube 44. Above the lead screw 45, and also extending between the housing 40 and block 42 is a cover 48 having attached to its under surface, and suitably insulated therefrom, a plurality of longitudinally extending bus bars 49, 49 which are engaged by brushes 50, 50 fixed to the top of the Y carriage to transmit electrical power and signals to the printing head 35 for operating the same. Also attached to the underside of the cover is an anti-rotation bar 51 which is engaged on opposite sides thereof by two rollers 47, 47 carried by the carriage 36 for rotation about vertical axes and which prevent the carriage 36 from rotating relative to the tube 44. In this manner the anti-rotation bar 51 and tube 44 guide the carriage 36 independently of the lead screw 45.

In order to achieve high accuracy in the plotting of points by the printing head it is necessary that the guide tube 44 be moved in exact parallelism across the plotting surface 30. To achieve this, and in accordance with the invention, the plotter is provided with two racks 52 and 54 located respectively to the left and right of the plotting surface 30 and attached to the base member 26 so as to extend parallel to the X direction. Rotatably supported by the housing 40 is a pinion 56 which meshes with the left hand rack 52. Fixed to this pinion is a drive or anti-skew rod 60 which extends through the guide tube 44 and has fixed to its other or right-hand end a pinion 58 which meshes with the right-hand rack 54. The left-hand end of the drive rod is rotatably supported in the housing 40 by a suitable bearing such as shown at 62 and the right hand end of the drive rod is likewise rotatably supported relative to the end block 42 by another bearing 64. Both pinions 56 and 58 are of the same size and number of teeth. Therefore, from FIGS. 2 and 3 it will be obvious that movement of the housing 40 in one direction or another along the X axis will cause rotation of the pinion 56. This rotation is in turn transmitted to the pinion 58 by the rod 60 so that the two pinions are moved in unison, and as a result of this the pinion 58 moves the end block 42 in unison with the housing 40 thereby eliminating any possibility of skewing of the guide tube 44 relative to the Y axis.

The two racks 52 and 54 may be secured to the base member 26 in various different ways and in the present case, as shown in FIG. 3, are received in parallel grooves 66, 66 milled in the base member and are held therein by screws 68, 68 passing through the base member and threadably engaging the racks. Preferably the two racks 52 and 54, in being manufactured, are cut as a pair so as to avoid any difference in the pitch or other dimensions thereof and are transversely aligned on the base member 26 so as to be in the same longitudinal positions relative to each other as when cut. The pinions are also preferably produced in a like manner by being cut as a pair and angularly fixed to the rod 60 so as to be in the same angular positions relative to each other as when cut.

The two pinions 56 and 58 do not serve to support any appreciable amount of the weight of the X carriage 38. Instead, separate means are provided for supporting the carriage from the base member and for guiding the carriage in its movement in the X direction. This guide means restrains the X carriage against movement in the vertical direction or to the right or left as viewed in FIG. 1, the carriage being free to move in translation only in the X direction. This means also preferably includes a means for affecting a slight vertical adjustment of the housing 40 and end block 42 so as to permit adjustment of the spacing between the pitch line of each pinion and its associated rack. Referring to FIG. 3, the illustrated support and guide means for the housing 40 includes the rack 52 which is formed with a longitudinally extending rib 70, of rectangular cross section, along its right hand side. Carried by the housing are two groups of four rollers, which groups are spaced in the X direction from each other, adapted to engage the rack 52. One such group of rollers as shown in FIG. 3 and includes a top roller 72, a bottom roller 74 and two side rollers 76 and 78. The top and bottom rollers 72 and 74 are supported for rotation about horizontal axes by associated journals 80 and 82, respectively, and the two side rollers 76 and 78 are supported for rotation about vertical axes by two journals 84 and 86, respectively. The top and bottom rollers respectively engage and roll along the top and bottom surfaces of the rectangular rib 70, the right side roller 76 engages and rolls along the vertical side surface of the rib 70 and the roller 78 engages and rolls along the left side surface of the main body of the rack 52. The two journals 80 and 82 have associated therewith respectively shanks 88 and 90 which extend through openings in the structure of the housing 40 and which shanks have their longitudinal axes located eccentrically relative to the axes of the associated journals 80 and 82. Between each shank and its associated journal portion is a collar 92 which engages the side surface of the housing 40. At its outer or right-hand end each shank is threaded and slotted, as shown, and receives a washer 94 and a nut 96. Tightening the nut on its shank clamps the housing structure between the associated collar 92 and washer 94 to hold the shank at a given angular position relative to the housing. Additional means such as a set screw or split clamp may also be used to aid in holding each shank against angular movement relative to the housing.

From FIG. 3 it will be obvious that due to the eccentricity of the journal 80 relative to the shank 88 the roller 72 may be moved to various different vertical positions relative to the housing 40 by rotating the shank 88. Likewise, the roller 74 may be adjusted vertically by angularly adjusting the associated shank 90. As a result of this adjustment the housing 40 may be raised or lowered slightly relative to the rack 52 to bring the pitch line of the teeth of the pinion 56 into such relationship relative to the pitch line of the teeth of the rack 52 that the pinion travels freely on the rack without any backlash or looseness therebetween. The same adjustment also permits the two rollers 72 and 74 to be adjusted vertically relative to each other to bring the same to the point where both rollers simultaneously engage the rib 70 to prevent any movement of the end block either downwardly or upwardly relative to the base member 26.

In the illustrated device it has been found to be unnecessary to provide for any transverse adjustment of the X carriage 38 and therefore the axis of the roller 76 is fixed relative to the housing 40 and only the roller 78 is adjustable in a horizontal plane in order to provide for varying the spacing between the two rollers 76 and 78 whereby both rollers may be made to simultaneously engage the rack 52 to prevent any transverse movement of the X carriage in the Y direction. The adjustability of the roller 78 is provided for in the same way as for the rollers 72 and 74, that is by providing an eccentric shank 98, a collar 99 and a washer and nut 100 and 101, as shown. If some transverse adjustment of the X carriage is desired, the roller 76 may also be made adjustable by providing it with an eccentric shank similar to the shanks 88 and 90.

The rollers 76 and 78 restrain the housing 40 against movement in the transverse or Y direction and since the end block 42 is connected to the housing 40 by the guide tube 44 and other bridging parts the same rollers also restrain the end block against transverse motion relative to the base 26 so that similar rollers need not be provided ofr the end block. Referring to FIG. 3 the end block 42 is however provided with two sets of two rollers, which sets are spaced from each other in the X direction. One of these sets of rollers is shown in FIG. 3. The right-hand rack is generally similar to the left-hand rack 52 and includes a longitudinally extending rib 102, of generally rectangular cross section, which rib is engaged by upper and lower rollers 104 and 106. Both of these rollers are supported for rotation about horizontal axes by journals 108 and 110, respectively, and both of these journals are associated with eccentrically related shanks 112 and 114 respectively, which pass through openings in the end block 42. Both shanks are provided with collars 116, 116 and washers 118, 118 and nuts 120, 120 whereby the two rollers 104 and 106 may be adjusted vertically relative to the end block 42 to control the spacing between the pitch line of the pinion 58 and the pitch line of the rack 54, and also to control the spacing between the rollers 104 and 106 so that each may be made to simultaneously engage the rib 102 to prevent any movement or looseness of the end block 42 in the vertical direction. From the foregoing it will be understood that the two racks 52 and 54 together with the longitudinal ribs 70 and 102 thereof define parallel ways or guides for the carriage 38. The use of the racks as such ways or guides is however not necessary and separate ways or guides or other means for supporting the carriage may be employed without departing from the broader aspects of the invention.

Included in the plotter are means for driving the Y carriage 36 in the Y direction and other means for driving the X carriage 38 in the X direction, both of which drive means are operable independently of the other. Considering first the drive for X carriage 38, the driving force is provided by a continuously operating electric motor 122, referred to hereinafter as the X motor, mounted on the framework of the plotter below the base member 26. The rotational output of the motor 122 is transmitted by suitable drive means such as a belt and pulley arrangement to the input shaft of a gear and clutch assembly 124 hereinafter referred to as the X gearbox, which gearbox is selectively operable to provide a number of different speed reductions between its input shaft, indicated generally at 126, and its output shaft 128. The output shaft 128 is in turn drivingly connected by two pulleys 130 and 132 and a belt 134 to a lead screw 136 extending longitudinally in the X direction along the left-hand side of the plotter as viewed in FIGS. 1 and 2. Preferably the pulleys 130 and 132 and the belt 134 are of the timing type, shaft 128 being provided with teeth so that rotation of the output shaft 128 is positively transmitted to the lead screw 136.

As shown in FIGS. 1 and 2, the lead screw 136 is rotatably supported for movement about its longitudinal axis by a plate 128 at the forward end of the plotter and by another plate 140 at the rear end of the plotter, suitable bearings (not shown) being provided for this purpose. As shown in FIG. 2 the plate 140 also carries a shaft encoder 142 connected with the lead screw 136 for measuring the angular position of the latter from a given reference point. The lead screw 136 is adapted to receive and threadably cooperate with a nut 144, preferably of the recirculating ball type, which nut is fixed to the housing 40 of the X carriage as shown best in FIG. 2. Therefore, from the latter figure it will be obvious that rotation of the lead screw 136 in one direction or the other about its longitudinal axis will serve to advance the nut 144 and accordingly the housing 40 in one direction or the other along the X axis, the longitudinal axis of the lead screw 136 being parallel to the X axis. Also, it will be obvious that the position of the X carriage along the X axis will be dependent on the angular position of the shaft and that therefore the output of the shaft encoder 142 may be taken to represent the position of the X carriage.

The drive means for the Y carriage 36 includes another continuously operating motor 150, hereinafter referred to as the Y motor, which is drivingly connected to the input shaft (not shown) of a gear and clutch arrangement 152, hereinafter referred to as the Y gearbox. The latter gearbox is similar to the X gearbox 124 and is selectively operable to provide a variety of speed reductions between its input shaft and its output shaft 154. The said output shaft 154 is drivingly connected with a spline shaft 156 by means of two pulleys 158 and 160 and a belt 162, the latter parts being preferably provided with teeth so that the movement of the output shaft 154 is positively transmitted to the spline shaft. The spline shaft is disposed parallel to the X axis and is suitably supported at its opposite ends by bearings (not shown) carried by the forward plate 138 and the rearward plate 140. Cooperating with the spline shaft 156 is a helical gear 158 which is angularly fixed to the spline shaft but free to move longitudinally thereof, the connection between the gear and the spline shaft also preferably being of the recirculating ball type. The helical gear 158 is in turn longitudinally fixed to the housing 40 by means of two transversely extending members 160, 160 in which the gear is rotatably supported by bearings 162, 162. Therefore, as the housing 40 moves in the X direction, as a result of rotation of the lead screw 136, the helical gear 158 is moved therewith longitudinally of the spline shaft.

As shown in FIG. 1 the helical gear 158 cooperates with another helical gear 164 which is arranged at a right angle thereto and fixed to the left-hand end of the lead screw 45, the gear 164 meshing with the gear 158 so that rotation of the gear 158 causes rotation of the gear 164 and lead screw 45. As mentioned previously rotation of the lead screw 45 serves to move the Y carriage 36 in one direction or another along the guide tube 44 as a result of a nut 46 threadably engaging the lead screw and fixed relative to the carriage 36. Also carried by the housing 40 is a shaft encoder, indicated generally at 166, which is directly connected with the lead screw 45 and serves to measure the angular position of said latter lead screw from a given reference position, such measurement being also a measurement of the position of the Y carriage along the Y axis.

PLOTTER WITH ANTI-VIBRATION MEANS—FIGS. 4, 5, 6, 7 AND 8

In very large plotters of the type shown in FIG. 1, attempts to drive the X and Y carriages at relatively high speeds and/or the presence of environmental vibrations may result in undesirable vibration of the rotating lead screws and spline shaft. This is due to the fact that in the construction shown in FIG. 1 the lead screws and spline shaft are supported at only three points (at both ends and the location of the associated carriage) and depending on the location of the carriages long lengths of the lead screws or spline shaft may be unsupported and therefore have a low natural frequency of vibration.

Referring to FIGS. 4 to 8, inclusive, these figures show a plotter which is generally similar to the plotter of FIG.

Figure 4:
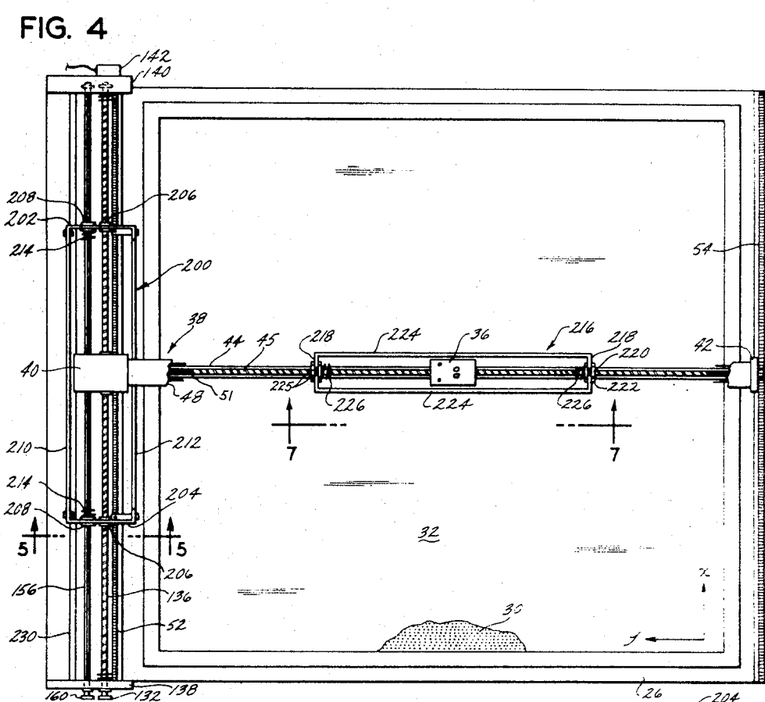
FIG. 4 is a plan view showing the carriage drive mechanism of an X-Y plotter generally similar to that of FIG. 1 but including means for preventing vibration of the lead screws and spline shaft.

1 but which is of a relatively larger size and provided with means in accordance with one aspect of the present invention for inhibiting vibrations of the rotating lead screws and spline shaft, thereby permitting the X and Y carriages to be driven at relatively high speeds. In these figures the same reference numerals as used in FIGS. 1, 2 and 3 have been applied to corresponding parts of the plotter shown in FIGS. 4 to 8, and these parts will not be described again in detail. Turning first to FIG. 4 the plotter therein shown is similar to the plotter of FIG. 1 in that it includes a base member 26 providing an upwardly facing surface 30 for supporting a chart sheet 32 and having secured thereto two rack members 52 and 54 located on opposite sides of the chart surface and extending in the X direction. Extending parallel and adjacent to the rack 52 is the lead screw 136 which upon rotation drives the housing 40 of the X carriage 38 in the X direction, the latter carriage being moved in parallelism across the chart sheet by pinions riding on the racks 52 and 54 and interconnected by an anti-skew shaft. Also included in the plotter of FIG. 4 is a spline shaft 156 which through helical gears carried in the housing 40 rotates the lead screw 45 extending between the housing 40 and the end block 42 to move the Y carriage 36 in the Y direction, the latter carriage being guided by the guide tube 44.

The anti-vibration means associated with the lead screw 136 and spline shaft 156, as shown in FIG. 4, comprises a cage, indicated generally at 200, elongated in the X direction and supported for movement relative to the base member 26 in the X direction only. The cage 200 includes two end walls 202 and 204 located on opposite sides of the housing 40, and each end wall includes a bearing 206 which rotatably supports the spline shaft 136 and a bearing 208 which rotatably supports the spline shaft 156. The two end pieces 202 and 204 are interconnected by suitable side pieces 210 and 212 extending in the X direction. Preferably, and as shown, the side pieces 210 and 212 are of such a length that the complete cage 200 has an overall length of approximately one-half the length of the lead screw 136 and spline shaft 156. At each end of the cage is a bumper spring 214 which serves to prevent the housing 40 from forcibly striking the cage when the latter is moved toward the end piece 202 or the end piece 204. The bumper springs 214, 214 may be located at any convenient place on the end pieces 202 and 204 and in the present instance are shown to be mounted adjacent the bearings 208, 208 so as to surround the spline shaft 156.

In FIG. 4 the housing 40 of the X carriage 38 is shown positioned approximately at the midpoint of the lead screw 136 and of the spline shaft 156, and the cage 200 is shown to be approximately centered about the housing 40. With the parts in these positions it will be seen that both the lead screw 136 and the spline shaft 156 are supported at five approximately evenly spaced points, the lead screw 136 being supported at both ends by the plates 138 and 140, by the bearings 206, 206 and by the housing 40, with the spline shaft 156 being supported by the two end plates 138 and 140, the two bearings 208, 208 and the housing 40. If the housing 40 is now moved in either direction along the X axis and within the space between the end walls 202 and 204 the cage will remain stationary and the bearings 206, 206 and 208, 208 will remain at the same supporting positions relative to the lead screw 136 and the spline shaft 156. If the housing 40 is moved rearwardly as viewed in FIG. 4, and beyond the location of the end wall 202 the housing 40 will engage the bumper spring 214 and push the cage 200 rearwardly thereby sliding the bearings 206, 206 and 208, 208 longitudinally relative to the lead screw and spline shaft. If the carriage 40 is moved rearwardly to the limit of its movement the cage 200 will be moved to the point where the lower bearings 206 and 208 are located at approximately the mid-point of the lead screw 136 and 156. The lead screw and spline shaft are thus supported at their mid-points by the bearings 204 and 208 and are thereby provided with a much higher critical speed than would otherwise be the case without the cage 200. The same conditions will of course also prevail when the carriage is moved to its forwardmost position. By this means the maximum unsupported length is reduced to one-half of the overall lead screw or spline shaft length.

Figure 5:
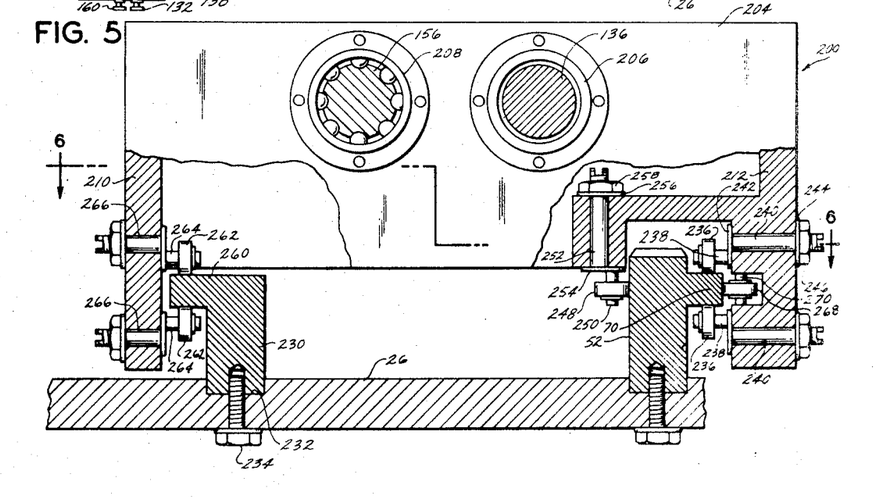
FIG. 5 is an enlarged vertical sectional view taken on the line 5—5 of FIG. 4, various parts being broken away to show the structure of other parts.
Figure 6:
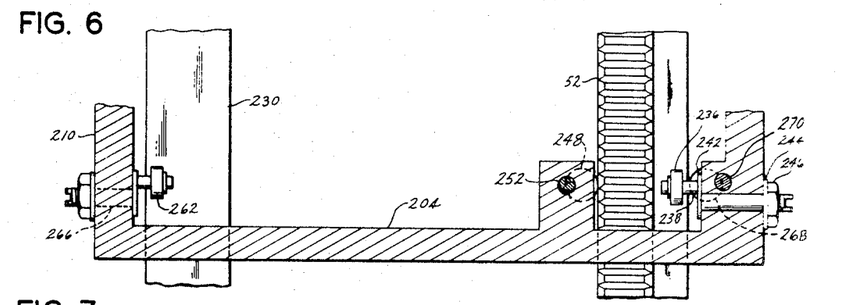
FIG. 6 is a horizontal sectional view taken on the line 6—6 of FIG. 5.
Figure 7:
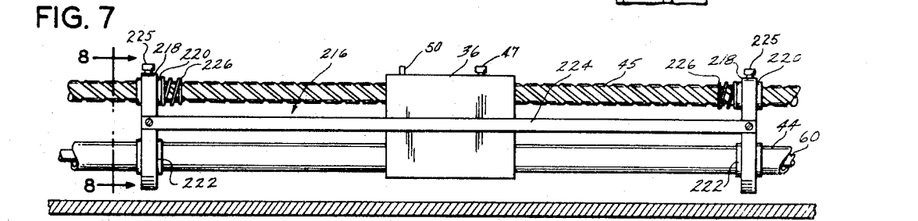
FIG. 7 is an enlarged vertical sectional view taken on the line 7—7 of FIG. 4.
Figure 8:
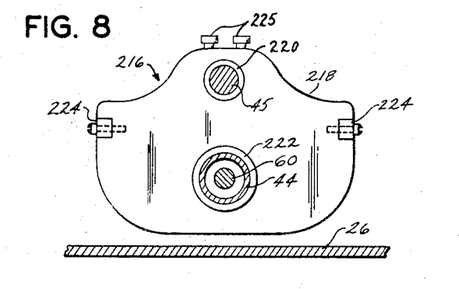
FIG. 8 is a vertical sectional view taken on the line 8—8 of FIG. 7.

As mentioned, the cage 200 is supported for movement in translation only along the X axis and restrained against movement in the vertical direction or normal to the plotting surface 30. Various different means for so supporting the cage may be employed, but preferably and as shown in FIGS. 5 and 6 the means for so supporting the cage includes the rack 52 and an additional guide member 230 which extends parallel to the rack 52 and is transversely spaced to the left thereof. The guide member 230 is fastened to the base member 26 in substantially the same manner as the rack 52, being received in a groove 232 and being held therein by a plurality of screws such as the one indicated at 234 in FIG. 5. The rack 52 and the guide member 230 serve as two parallel guides or ways on which the cage 200 is mounted for translational movement. Referring to FIGS. 5 and 6, the front right-hand corner of the cage 200 is provided with two rollers 236, 236 adapted to engage the opposite sides of the longitudinal rib 70 on the rack 52 and supported for rotation about horizontal axes by journals 238, 238. The latter journals are supported by eccentric shanks 240, 240 which pass through the structure of the cage, and associated with each shank 240 is a collar 242, a washer 244 and a nut 246 whereby the shank 240 may be angularly adjusted relative to the cage structure to raise or lower the associated roller 236. Also associated with the front right-hand corner of the cage 200 are two other rollers 248 and 268 supported for rotation about vertical axes and adapted to engage opposite side faces of the rack member 52. The roller 268 is supported by a fixed journal 270 while the roller 248 is supported by a journal 250 adjustable relative to the cage by means of an eccentric shank 252, a collar 254, a washer 256 and a nut 258. A similar set of four rollers such as shown at 236, 236, 248 and 268 is also provided at the rear right-hand corner of the cage 200.

As shown in FIG. 5, the guide member 230 includes a longitudinally extending rib 260 which is engaged on opposite sides by two rollers 262, 262 supported by journals 264, 264 for rotation about horizontal axes, the journals 264, 264 having associated therewith eccentric shanks 266, 266 and other structure similar to that described in connection with the journals 238, 238, for adjusting the rollers 262, 262 vertically relative to the body of the cage. A set of two rollers similar to the rollers 262, 262 is also provided at the rear left-hand corner of the cage 200.

From FIGS. 5 and 6 it will therefore be obvious that by adjusting the rollers 236, 236 and 262, 262 the cage 200 may be moved vertically relative to the base member 26 to bring the bearings 206 and 208 into vertical alignment with the longitudinal axes of the lead screw 136 and spline shaft 156. Similarly, all of the rollers may be adjusted relative to one another so that all simultaneously engage the corresponding guide surfaces of the guide member 230 and rack 52 thereby preventing any vertical or transverse movement of the cage relative to the base member.

The antivibration means for the lead screw 45 is substantially similar to that provided for the lead screw 136 and spline shaft 156 and constitutes a cage 216 including two end walls or pieces 218, 218 located on opposite sides of the carriage 36. Each end wall 218 has fixed thereto a bearing 220 which rotatably supports the associated lead screw 45 and a sleeve 222 which slidably engages the guide tube 44. The two end walls 218, 218 are interconnected by two side pieces 224, 224 which extend in the Y direction and which preferably are of such a length as to provide the cage 216 with an overall length equal to approximately one-half a length of the lead screw 45. Mounted and adjacent each bearing 220 and surrounding the lead screw 45 is a bumper spring 226 adapted to cushion the engagement of the Y carriage 36 with either end wall 218, 218 when the latter carriage is moved toward such end wall. In FIG. 4 the carriage 36 is shown positioned approximately at the mid-point of the lead screw 45 and the carriage 216 is approximately centered about the carriage 36. With the parts in these positions the lead screw 45 is supported at five approximately evenly spaced points by the housing 40, the two bearings 220, 220, the carriage 36 and the end block 42. The carriage 36 is movable relative to the cage 216 between the two end pieces 218, 218 and if moved beyond the location of either end piece the carriage, through engagement with the associated bumper spring, will push the cage 216 to shift the location of the lead screw support bearing 220, 220. When the carriage 36 is moved either to the extreme right or to the extreme left position relative to the chart sheet 52 one or the other of the support bearings 220, 220 will be located at approximately the mid-point of the lead screw 45 so that the longest unsupported portion of the lead screw will be equal in length to no more than one-half the length of the entire lead screw. Thus the critical speed of the lead screw is substantially increased from what it would be without the cage 216. Mounted on the top of each end wall 218 are two guide rollers 225 which respectively engage and roll along opposite sides of the anti-rotation bar 51 to provide additional restraint for the cage.

Figure 9:
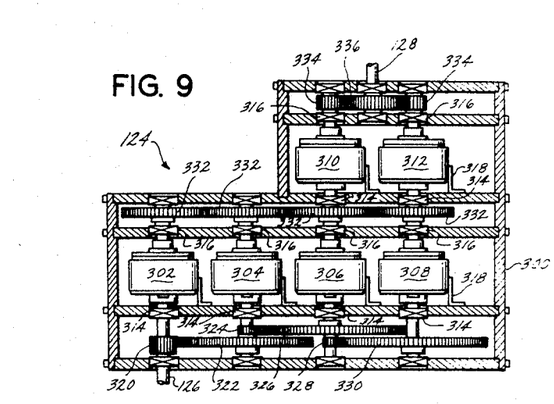
FIG. 9 is a plan view of one of the gearbox and clutch mechanisms used in the plotter of FIG. 1.

X–Y GEARBOXES—FIG. 9

FIG. 9 shows somewhat schematically the structure of a gear box and clutch assembly selectively operable to provide various different speed reductions and also selectively operable to provide for rotation of the output shaft in one or other directions. The structure shown in FIG. 9 may be used as either the X gearbox 124 or the Y gearbox 152, but for the purpose of discussion it is taken to be the X gearbox 124.

Included in the illustrated gearbox 124 is a framework or housing 300 carrying four speed control clutches 302, 304, 306 and 308 and two direction control clutches 310 and 312. Each clutch includes an input shaft supported relative to the housing 300 by a bearing 314 and an output shaft supported relative to the housing by a bearing 316. Each clutch is of the electromagnetic variety and includes an electrical coil contained within a housing fixed relative to the stationary framework 300 by a bracket 318. Energization of the coil operates the mechanism of the clutch to establish a driving connection between the associated input shaft and output shaft of the clutch. When the coil is deenergized the driving connection between the associated input and output shafts is broken.

The input shaft of the gearbox 124 is indicated at 126. and as illustrated this shaft also comprises the input shaft for the clutch 302. Fixed to the shaft 126 is a small gear 320 which drives a large gear 322 fixed to the input shaft of the clutch 304 so that the latter input shaft is driven at a speed substantially reduced from that of the input shaft 126. Other gears 324, 326, 328 and 330 are fixed to the input shafts of the clutches 304, 306 and 308 and serve to effect similar speed reductions so that the input shaft of the clutch 306 is driven at a speed reduced from that of the input shaft of the clutch 304, and the input shaft of the clutch 308 is driven at a still further reduced speed.

As mentioned previously the motor associated with the gearbox 124 is driven continuously, and therefore all of the input shafts of the clutches 302, 304, 306 and 308 are likewise driven continuously but at different speeds. Fixed to the output shaft of each speed control clutch is a gear 332, the four gears 332, 332 being arranged as shown to form an intermeshing gear train whereby rotation of any one of the gears will cause rotation of all the others. It will therefore be obvious that energization of any one of the speed control clutches 302, 304, 306 or 308 will cause rotation of the train of gears 332, 332, the speed of rotation of the latter gears being dependent on which speed control clutch is operated. It will also be noted that the arrangement of the gears is such that for a given direction of rotation of the input shaft 126 the gears 332, 332 will rotate in the same direction regardless of which one of the speed control clutches is operated.

The output shafts of the two clutches 306 and 308 are connected directly to the input shafts of the direction control clutches 310 and 312. The output shaft of each of these clutches has fixed thereto a gear 334, and both of the gears 334, 334 mesh with a common gear 336 fixed to the gearbox output shaft 128. From FIG. 9 it will be obvious that when the train of gears 332, 332 is in motion, as a result of operation of one of the speed control clutches, the gear 332 fixed to the input shaft of the direction control clutch 310 will rotate in a direction opposite to the direction of rotation of the gear 332 fixed to the input shaft of the direction control clutch 312. Therefore, operation of one or the other of the direction control clutches will cause the output shaft 128 to rotate in one or the other directions respectively. Also, simultaneous operation of the two clutches 310 and 312, when none of the speed control clutches is energized, will serve to lock the output shaft 128 relative to the framework 300 and prevent its rotation in either direction.

Figure 10:
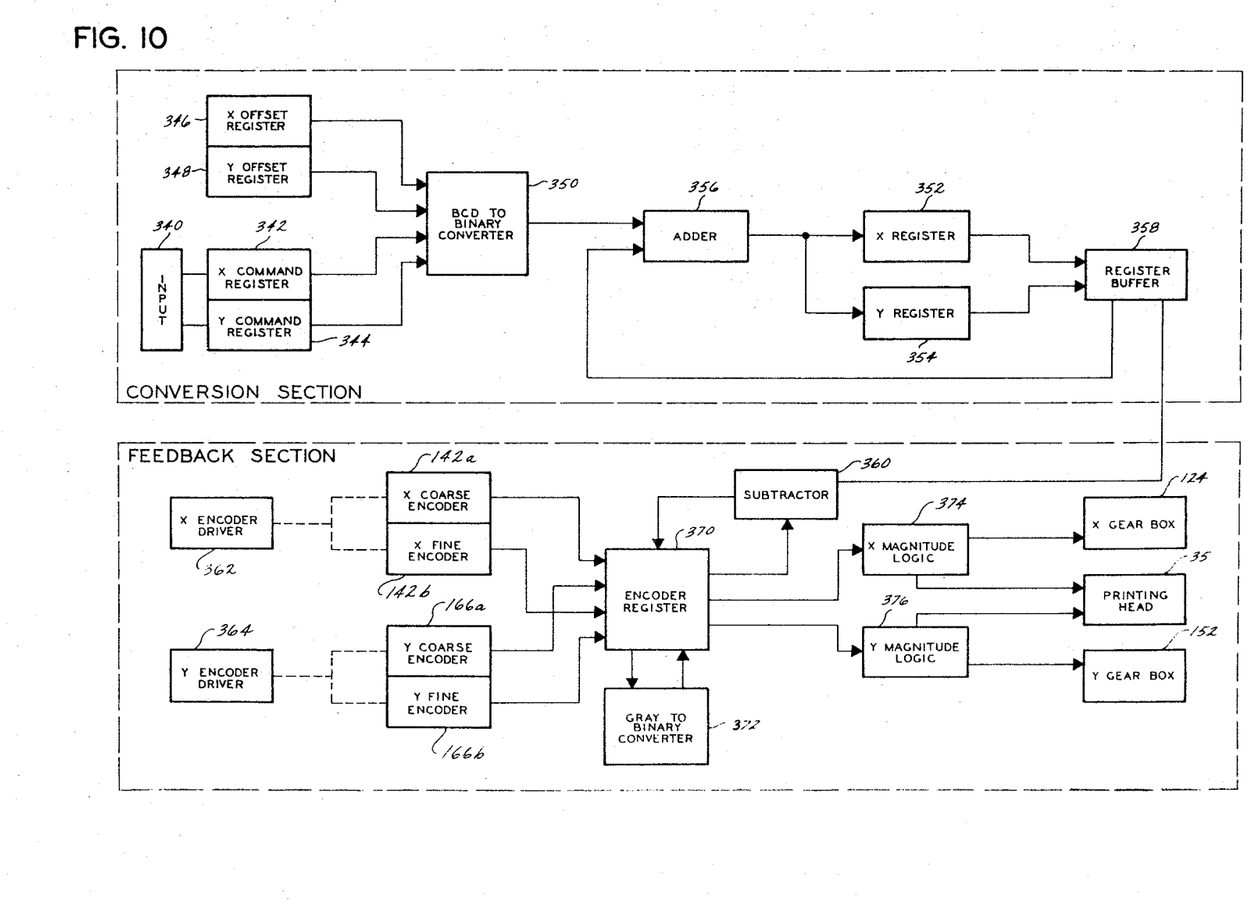
FIG. 10 is a schematic block diagram of the electronic control means for the plotter of FIG. 1.

GENERAL ORGANIZATION AND OPERATION OF PLOTTER DRIVE CONTROL SYSTEM—FIG. 10

The drive control mechanism for the plotter, operating through the X and Y gearboxes 124 and 152, serves to control the motion of the X and Y carriages in such a manner that information fed into the plotter is plotted point by point by the printing head 35 on the chart sheet 32. Information may be supplied to the plotter by various different means such as punched paper tape or punched cards, or may be inserted directly by means of a keyboard contained on the console 22. The control system accepts information as to a first set of coordinates and thereafter automatically functions to move the printing head to the point on the chart sheet defined by such coordinates. The printing head is then operated to mark the point on the chart sheet. Information as to the coordinates of the next point are then accepted by the control system and in response to this information the next point is plotted. This procedure is repeated until all of the desired points are marked or plotted on the chart sheet.

In accordance with one aspect of the present invention, and as hereinbefore mentioned briefly, the control of the plotter drive is such that both the X and Y carriages are driven at speeds which are dependent on the absolute displacement of the printing head, in the X and Y directions respectively, from the location of the point to be plotted. Broadly stated this control is achieved by determining the actual or present coordinates of the printing head and by subtracting these coordinates respectively from the X and Y coordinates of the point to be plotted. The difference between the actual and desired X coordinates therefore represents the displacement, in the X direction, of the printing head form the desired point and is referred to sometimes hereinafter as the X error. This X error measurement is in turn used to control the drive for the X carriage in such a manner that as the magnitude of the error or displacement decreases the speed of the carriage decreases. That is, if the X carriage is initially located a relatively long distance from the X coordinate of the point to be plotted it is initially driven at a relatively high speed toward such coordinate and is thereafter shifted down to lower speeds as the coordinate is approached. The speed shifting is further such that when the X error falls below a given small value the X carriage is driven at such a slow speed as to be capable of being stopped instantaneously and without overshoot when the error reaches zero. In a similar manner the difference between the actual and the desired Y coordinates of the printing head are used to control the drive for the Y carriage. The various position sensing and subtracting processes required to determine the X and Y errors are carried on at high repetition rates so that the control system is continuously informed throughout the driving process of the changing values of said errors and with the result that the carriages are immediately slowed from one speed to another as the magnitudes of the errors pass below various predetermined limits.

The control system is in the nature of a digital computer with the necessary subtraction and other required processes being carried out by the manipulation of binary or other numbers rather than by analog values. The system is made up of various component parts each of which components may be any one of various different constructions well known in the computer art. The general organization of the control system is shown in block diagram form in FIG. 10 to which figure reference is now made for a description of its general operation.

As shown in FIG. 10 the control system is conveniently divided into two sections designated the conversion section and the feedback section. The conversion section operates on information regarding the points to be plotted which information defines the X and Y coordinates of the points with respect to a given set of reference axes, and on information regarding the desired locations of said given reference axes on the chart sheet 32, and converts this information into a form usable by the feedback section. Information as to the X and Y coordinates of points to be plotted is fed into the conversion section in binary coded decimal form by a suitable input device 340 which, as mentioned previously, may take various different form such as a punched tape reader, a punched card reader or a keyboard located on the console. The information received for each point includes several binary coded decimal digits and a sign digit for each coordinate of the point, the several binary coded digits representing the displacement of the point from the given reference axis and the sign digit representing the direction of such displacement. In the illustrated case it is assumed that the information handled by the input device 340 is in binary coded decimal form, however, this is not necessary and the information may be in another form such as pure decimal, in which case an additional converter is used to convert the same into binary coded decimal form before being transmitted to other parts of the conversion section. Associated with the input device 340 are two command registers 342 and 344, the register 342 serving to receive and hold information in binary coded decimal form as to the X coordinate of the point to be plotted and the register 344 serving to receive information in binary coded decimal form as to the Y coordinate of the point to be plotted.

Insofar as the shaft encoders and other parts of the plotter are concerned all measurements are made from a set of nominal or plotter axes which intersect at a point adjacent one corner of the plotting surface 30. In order that the points to be plotted may be plotted on the chart sheet 32 with the reference axes thereof located otherwise than coincident with the nominal axes, the conversion section also includes X and Y offset registers 346 and 348 whereby information may be fed into the machine as to the amount by which the actual plotting or reference axes are to be offset from the nominal axes. The offset registers 346 and 348 each may consist of a plurality of thumbwheel switches and a toggle switch, the thumbwheel switches being used to insert a number representative of the desired offset of the associated reference axis from the nominal axis and the toggle switch being employed to insert the desired sign of the number. After the thumbwheel switches and toggle switches of the two offset registers are set no further change therein is generally made throughout the plotting process carried out on one given chart sheet. That is, the registers thereafter retain the same offset numbers for all points plotted so that all of said points are plotted with respect to the same reference axes. The outputs of the offset registers are in binary coded decimal form. It should also be noted that in place of manually set offset registers the desired offset could also be provided by registers supplied with information introduced from the input tape, cards or other input medium. In this case the offset information could be introduced at the time of introducing the coordinates of the first point to be plotted and then stored and used with each subsequent point until new offset information is introduced. Alternately, the offset information could be introduced with the coordinate information of each point.

Assuming that the X and Y offset registers 346 and 348 are adjusted as desired and that the X and Y command registers 342 and 344 are supplied with information as to the coordinates of a point to be plotted, the conversion section of the control system operates to first convert the command and offset register outputs from binary coded decimal form to straight binary form. This conversion of binary coded decimal numbers to straight binary form is performed by a converter 350 which receives the outputs from the X and Y offset registers 346 and 348 and the outputs from the X and Y command registers 342 and 344. The converter 350 is or may be a serial shift register with associated control logic. The converter operates to first convert the X axis input from the X offset register 346 into straight binary form with the ones complement of the number being produced if the sign is negative. This information is then sent through an adder 356 to an associated X register 352. If the information passing through the adder 356 at this time happens to be a ones complement the adder adds a one to the least significant bit to form the two's complement. Therefore, if the number in the offset register is positive the X register receives the corresponding straight binary number whereas if the number in the offset register is negative the X register receives the twos complement of the corresponding straight binary number. After this function is performed the converter 350 next operates to convert the X axis input from the X command register 342 into straight binary form with the ones complement of the number again being produced if the sign is negative. After this information is produced it is sent to the adder 356 where a one is added to the least significant bit to form the twos complement if the information happens to be a ones complement. The adder then also operates to add this latter information or number to the offset information already in the X register 352. The sum is then sent to and stored in the X register in place of the former information. The number now in the X register therefore represents in binary form the displacement in the X direction of the point to be plotted from the nominal X axis, and is referred to sometimes hereinafter as the adjusted X command number. The converter 350 therefter operates in the same manner on the inputs provided by the Y offset register 344 and the Y command register 348, except that at this time the converter operates in conjunction with a Y register 354 and with the end result of the Y register being provided with a stored binary number, referred to sometimes hereinafter as the adjusted Y command number, representative of the displacement in the Y direction from the nominal Y axis of the point to be plotted.

The X and Y registers 352 and 354 are memory devices and may take various different forms, such as serial delay lines. In the illustrated case they are serial shift registers which, as mentioned, hold the offset binary numbers, or the twos complements thereof for later addition to the command binary numbers, or the twos complements thereof. Also and as mentioned, they hold the results (the adjusted X and Y command numbers) of the binary additions of the offset and command numbers or twos complements for later use in the feedback cycle.

Associated with the two registers 352 and 354 is a register buffer 358 which operates to properly channel the contents of the X and Y registers 352 and 354 into the adding device 356 during the conversion process, or into a substractor 360 during the feedback process.

The feedback section of the control system includes the X and Y shaft encoders 142 and 166 for converting the position of the associated lead screws 136 and 45 into a binary coded digital number, each of which in the present case is shown to comprise a coarse encoder sensing head and a fine encoder sensing head. With respect to the X axis the coarse encoder sensing head as shown at 142a and the fine encoder sensing head at 142b. With respect to the Y axis the coarse encoder sensing head is shown at 166a and the finer encoder sensing head at 166b. The outputs of the encoders are in Gray Code and associated with the encoders is an X encoder driver 362 and a Y encoder driver 364 which generate pulses at appropriate times to interrogate the encoder sensing heads. Since the encoders are directly driven by the lead screws for the two carriages the outputs therefrom indicate the present position of the plotter printing head 34 with respect to the nominal axes.

In addition to the encoders, the feedback section also contains the necessary logic to convert the Gray Code output of the encoders into straight binary forms, to compute the difference between the present position of the printing head and the desired position as dictated by the conversion section, and to activate the speed and direction clutches of the X and Y gearboxes 124 and 152 in accordance with the sign and magnitude of such differences. This logic associated with the encoders includes an encoder register 370 which first accepts information from the X encoder sensing heads 142a and 142b and then circulates the same through a serial Gray to binary converter 372 to convert and combine the coarse and fine encoder information into a single straight binary number. This number represents the present X coordinate of the printing head and is sometimes referred to hereinafter as the present X number. This present X number is then transferred to the subtractor 360 and therein subtracted from the adjusted X command number in the X register 352 to determine the X error, such error being in the form of a straight binary number comprising a plurality of digit bits representing the absolute magnitude of the error and one sign bit representing the sign of the error. This X error number is then used to control the speed and direction clutches of the X gearbox 124, as hereinafter described in more detail, so as to drive the X carriage in the proper direction as to reduce the error and at a speed dependent on the magnitude of the error. In FIG. 10 the logic device for controlling the X gearbox in response to the X error is indicated at 376.

The encoder register 370 and the associated logic is alternatively used with the X axis values and the Y axis values so that after operating on the X axis values to find the X error the same process as above described is performed in regard to the Y axis values to produce the Y error. Also associated with the encoder register 370 is a Y magnitude logic 376 for controlling the clutches of the Y gearbox in response to the Y error. The alternate determination of the X and Y errors is carried on at a high repetition rate, and as they appear in the encoder register the error numbers are sent to the appropriate X and Y magnitude logics 374 and 376, so that the magnitude logics are continuously supplied with information as to said errors throughout the driving process. These error numbers or signals are used to activate the clutches in the X and Y gearboxes in such a manner that the speed of the output shaft of each gearbox decreases as the error or displacement of the printing head from the desired end position decreases. When the error becomes zero on both axes a signal is generated through the X and Y magnitude logics to cause the printing head to print or otherwise mark the desired point on the chart sheet.

Figure 11:
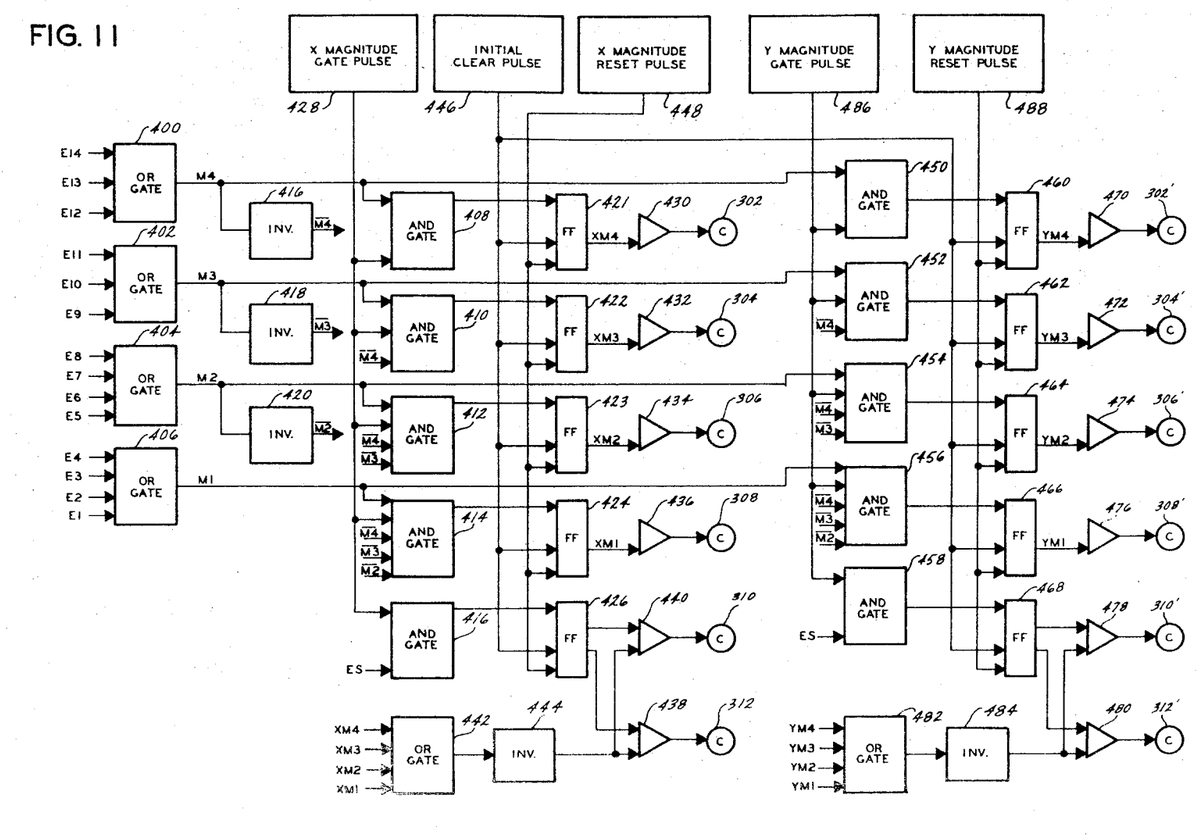
FIG. 11 is a more detailed block diagram of the logic system, forming a part of the control means of FIG. 10, for controlling the speeds of the X and Y carriages in response to the displacement of each carriage from the point to be plotted.

X AND Y MAGNITUDE LOGICS—FIG. 11

Reference is now made to FIG. 11 for a more detailed dscription of the X and Y magnitude logics 374 and 376 which serve to control the output speed of the X and Y gearboxes in response to the magnitudes of the X and Y error numbers periodically appearing in the encoder register 370. In this figure the encoder register is considered to consist of fifteen signal outputs or the like, fourteen of which represent the digits of a fourteen place binary number and the fifteenth of which represents the sign of the number. The signal outputs of this register are designated by the characters E1 to E14 and ES wherein E1 represents the least significant bit of the binary number, E2 represents the next least significant bit and so forth to E14 which represents the most significant bit. ES represents the sign of the number. The presence of a signal at E1 indicates a one and the absence of a signal indicates a zero. The same convention applies to all of the other digits of the number. The presence of a signal at ES represents a negative number whereas the absence of a signal represents a positive number.

The outputs of the encoder register are transmitted to four OR gates 400, 402, 404 and 406 with the outputs E12, E13 and E14 going to the gate 400, the outputs E9, E10 and E11 going to the gate 402, the outputs E5, E6, E7 and E8 going to the gate 404 and with the outputs E1, E2, E3 and E4 going to the gate 406. Considering the gate 400, if the most significant bit of the error number occurs in the twelfth, thirteenth or fourteenth position, a signal will appear at E12, E13 and E14 with the result that an output, labeled M4, will be derived from the gate 400. Likewise, if a one appears in any one or more of the ninth, tenth or eleventh positions of the number, an output labeled M3, will be drived from the gate 404; and if a one appears in any one or more of the first, second, third or fourth positions of the number, and output labeled M1, is derived from the gate 406. From this it will be seen that the presence or absence of the output signals M4, M3, M2 and M1 represents the magnitude of the encoder number. The presence of the output signal M4 indicates that the number is of such a magnitude as to have its most significant bit in the twelfth, thirteenth or fourteenth position. The absence of the signal M4 and the presence of the signal M3 indicates that the number is of such a magnitude as to have its most significant bit in the ninth, tenth or eleventh position. The absence of the signals M4 and M3 together with the presence of the signal M2 indicates that the number is of such a magnitude as to have its most significant bit in the fifth, sixth, seventh or eighth position, while the absence of the signals M4, M3 and M2 and the presence of the signal M1 indicates a number having its most significant bit in the first, second, third or fourth position. Absence of all of the signals M4, M3, M2 and M1 indicates that the error number in the encoder register is zero. At this point it should also be noted that the gate structure could be patchboarded or even switch programmed to vary the actual magnitudes of the numbers represented by said presence and absence of the M4, M3, M2 and M1 signals, and more particularly to vary the points at which said signals are switched from one state to another.

The magnitude signals M4, M3, M2 and M1 are used to control the clutches of the X and Y gearboxes through other associated circuitry which functions to detect the presence or absence of the said magnitude signals and to operate the clutches accordingly. Considering first the operation of the gearbox 124 associated with the X carriage or lead screw, the output signal M4 is conducted to an AND gate 408, the output signal M3 is conducted to an AND gate 410, the output M2 is conducted to an AND gate 412 and the output M1 is conducted to an AND gate 414. The outputs M4, M3 and M2 are also conducted respectively to inverters 416, 418 and 420 which serve to produce output signals when no signals appear on the associated input lines. That is, the inverter 412 produces a signal, labeled $\overline{M4}$, when the M4 magnitude signal is absent from the associated input line. Likewise, the inverter 418 produces an output signal $\overline{M3}$ to indicate the absence of the signal M3, and the inverter 420 produces an output signal $\overline{M2}$ indicative of the absence of the signal M2. The output of the inverter 416 constitutes an input to the AND gates 410, 412 and 414; the output of the inverter 418 constitutes an input to the AND gate 412 and 414; and the output of the inverter 420 constitutes an input to the AND gate 414.

The four AND gates 408, 410, 412 and 414 comprises part of the speed control circuitry for the X axis drive while another AND gate 416 comprises part of the direction control for the X axis drive. One input for the latter AND gate 416 constitutes the sign or ES signal from the encoder register. Associated with the AND gates 408, 410, 412, 414 and 416 are flip-flop devices 421, 422, 423, 424, and 426, respectively. With regard to each of these flip-flops, the illustrated upper input to the left of the device operates to set the flip-flop while either of the two lower inputs serves to reset the same. Also associated with the AND gates 408 to 416 is a device 428 for producing a gate pulse which is so regulated by a suitable clocking or timing device that the pulses produced thereby occur simultaneously with the appearance of the X error numbers in the encoder register 370. That is, each time an X error number appears in the encoder register the device 428 produces a gate pulse transmitted to the AND gates 408 to 416. Assume therefore that the error number in the encoder is of such a magnitude as to have its most significant bit in either the twelfth, thirteenth or fourteenth position so as to produce an M4 magnitude signal. This M4 magnitude signal is then applied to the AND gate 408 simultaneously with a gate pulse from the device 428 with the result that an output signal is produced from said gate. This latter output signal is in turn transmitted to the associated flip-flop 421 thereby setting or changing the state of the same to produce an output signal, labeled XM4, which is transmitted through a solenoid driver or amplifier 430 to actuate the high speed direction control clutch 302. At the same time as the M4 signal is applied to the AND gate 408 to cause actuation of the associated clutch 302 the $\overline{M4}$ signal is not produced by the inverter 416 and is therefore absent from the AND gates 410, 412 and 414 to prevent operation of the other speed control clutches 304, 306 and 308. That is, one signals appearing in the less significant bits of the error number are inhibited from activating the lower speed control clutches.

If the most significant bit of the error number in the encoder register is in the ninth, tenth, or eleventh position, an M3 signal will be produced by the OR gate 402 and no $\overline{M4}$ signal will be produced by the gate 400 with the result that the inverter 416 will produce an $\overline{M4}$ signal. Therefore, when the gate pulse produced by the device 428 appears all three inputs to the AND gate 410 will be simultaneously energized with the result that an output signal is sent to the flip-flop 422 to set the same and thereby produce a signal, labeled XM3, transmitted through a solenoid driver 432 to the higher intermediate speed clutch 304 thereby energizing the latter to cause rotation of the output shaft of the gearbox at a speed somewhat reduced from that of the speed obtained through energization of the high speed clutch 302. At the time the clutch 304 is energized the absence of the M4 signal prevents the production of an output signal from the AND gate 408 to energize the high speed clutch 302. Likewise the absence of an $\overline{M3}$ signal from the inverter 418 prevents the simultaneous energization of the lower speed clutches 306 and 308.

In the same maner it will be seen from FIG. 11 that when the most significant bit of the error number is in the fifth, sixth, seventh or eighth position the lower intermediate speed clutch 306 will be operated through the solenoid driver 434 to the exclusion of the other clutches, and that if the most significant bit of the error number is in the first, second, third or fourth position the low speed clutch 308 will be operated through the solenoid driver 436 to the exclusion of the other clutches.

Considering the AND gate 416, if no ES signal is applied to said gate at the time of the occurrence of the gate pulse from the device 428 no set signal is applied to the associated flip-flip 426 with the result that a signal is applied to a solenoid driver 438 and from the latter to the direction control clutch 312. If the signal ES does appear at the AND gate 416 simultaneously with the gate pulse a set signal is applied to the flip-flop 426 which causes an output signal to be transmitted to the solenoid driver 440 to energize the associated clutch 310. Therefore, either the clutch 310 or the clutch 312 will be energized depending on the presence or absence of the ES signal to cause rotation of the output shaft of the gearbox in either the clockwise or counterclockwise direction as required to reduce the error. The outputs XM4, XM3, XM2 and XM1 of the flip-flops 421, 422, 423, and 424 in addition to being transmitted to the associated solenoid drivers 430, 432, 434 and 436 are also transmitted to an OR gate 442 having associated therewith an inverter 444. When none of the XM4, XM3, XM2 and XM1 signals are present at the OR gate 442 the associated inverter 444 produces an output signal which is transmitted to both of the solenoid drivers 438 and 440 thereby energizing both of the direction control clutches 310 and 312. In other words, when none of the direction control clutches 302, 304, 306 and 308 are energized, as when the error is reduced to zero, both of the direction control clutches 310 and 312 are energized with the result that the output shaft of the gearbox is locked in its final position to prevent any drift of the X carriage from the zero error coordinate.

Also included in the above described logic for the X magnitude is a device 446 for producing an initial clear pulse and a device 448 for producing an X magnitude reset pulse, both of which devices have their outputs connected to the reset inputs of the flip-flops 421, 422, 423, 424 and 426. The initial clear pulse device 446 operates once at the beginning of the feed-back cycle to produce a pulse which resets all of the flip-flops so that the latter are all in the same state at the beginning of the feed-back process. The X magnitude reset pulse device 448 produces a reset pulse which is timed to occur just prior to the X magnitude gate pulse produced by the device 428. Therefore, each time a reset pulse is produced by the device 448 all of the flip-flops 421 to 426 are reset. Then, immediately thereafter and assuming the X error is not zero, one of the speed control flip-flops 421, 422, 423 and 424 is operated by the X magnitude gate pulse. The direction control flip-flop 426 may or may not be operated by the X magnitude gate pulse depending on the presence or absence of the sign signal ES from the gate 416. The presence of the X magnitude reset pulse allows for the de-energization of one speed control clutch and the energization of another as the X error number passes below a predetermined limit. Suppose, for example, that at one time a twelve place X error number appears in the encoder register and that the next time an X error number appears therein it is reduced to an eleven place number. When the first number is in the register the X magnitude reset pulse provided by the device 448 resets all of the flip-flops 421 to 424 and immediately thereafter when the X magnitude gate pulse is produced by the device 428 the M4 signal produced by the OR gate 400 in conjunction with the X magnitude gate pulse sets the flip-flop 421 to energize the high speed clutch 302. Thereafter the X magnitude reset pulse appears again to reset all flip-flops including the flip-flop 421. Thereafter the X magnitude gate pulse immediately appears again, but this time, due to the reduction in the error signal from a twelve to an eleven place number, M3 signal rather than an M4 signal is produced with a result that the AND gate 410 transmits a set signal to the flip-flop 420 to energize the higher intermediate speed clutch 304. Thereafter the flip-flop 422 is reset by each reset pulse produced by the device 488 and immediately set again by the gate pulses from the device 428 until the X error number becomes an eight place number, after which the flip-flop 424 is set by each gate pulse to energize the clutch 306. Likewise, the flip-flop 424 is set by each gate pulse 428 after the X error number falls to a four place number to energize the low speed clutch 308.

Considering now the magnitude logic associated with the Y axis, this logic is generally similarly to that provided for the X axis and includes AND gates 450, 452, 454, 456 and 458. Also included are flip-flops 460, 462, 464, 466 and 468, and solenoid drivers 470, 472, 474, 476, 478 and 480. The solenoid drivers 470 to 480 are associated respectively with the speed and direction control clutches of the Y gearbox 152 which clutches have been given the same reference numerals as those of the gearbox 124 except for being primed. An OR gate 482 and an associated inverter 484 are also provided for effecting simultaneous energization of the clutches 310' and 312' when the Y error becomes zero. The AND gate 450 has as one of its inputs the output of the OR gate 400. The AND gate 452 has as one of its inputs the output of the OR gate 402 and as another input the output of the inverter 416. The AND gate 454 has as one of its inputs the output of the OR gate 404 and as other inputs the outputs of the inverters 416 and 418. The AND gate 456 has as one of its inputs the outputs of the OR gate 406 and as other inputs the outputs of the inverters 416, 418 and 420. Associated with the AND gates 450 to 458 is a Y magnitude gate pulse device 486 which produces a gate pulse transmitted simultaneously to the inputs of said AND gates and occurring simultaneously with the appearance of the Y error number in the encoder register 370. Associated with the flip-flops 460 through 468 is a Y magnitude reset pulse device 488 which produces a reset pulse occurring immediately before the gate pulse produced by the device 486 for resetting the Y magnitude flip-flops 462 to 478 in the same manner as the X magnitude reset pulse device 448 resets the X magnitude flip-flops 421 to 426. The flip-flops 460 to 468 also include inputs from the initial clear pulse device 446 for causing said latter flip-flops to be reset at the beginning of the feed-back cycle.

From the foregoing and from FIG. 11 it will therefore be obvious that the magnitude logic for the Y axis operates in the same manner as the above described logic for the X axis with the X and Y magnitude logics operating alternately in timed relationship with the alternate appearance of the X and Y error numbers in the encoder register.

Although not shown in FIG. 11 it will be noted that the appearance of an output signal from the inverter 444 represents a satisfaction of the X command number and that an output signal from the inverter 484 represents a satisfaction of the Y command number. Therefore, both of these outputs may be transmitted to an AND gate which operates when both inverter output signals are present to produce a signal indicative of satisfaction of both coordinate command signals and which latter signal may be used to operate the printing head 35 to cause the same to mark the chart sheet with the desired point and to thereafter initiate the plotting of the next point.

The actual speeds at which the carriages are driven and the points at which the speed shifting occurs may vary from plotter to plotter depending on the size of the plotter and other circumstances. The speed of carriage movement obtained through energization of each speed control clutch depends obviously on the various speed reductions afforded by the gears in the gearbox and by the other driving connections between the drive motors and the carriages and may be varied by changing the size of the gearbox gears. FIG. 11 shows a simple arrangement of inputs to the OR gates 400, 402, 404 and 406 wherein the speed shifts occur at points where the binary error numbers change in regard to the number of positions or places involved. For example, the shift from the highest speed to the lowest speed occurs where the error number changes from a 12 to an 11 place binary number, which is between 2047 and 2048 counts. The next shift occurs when the error number changes from a 9 to an 8 place number, or between 255 and 256 counts. The next shift occurs when the error number changes from a 5 to a 4 place number, or between 15 and 16 counts, and the next shift to zero speed occurs between one and zero counts. It will be understood, however, that by rearranging the inputs to the OR gates and, if necessary, using additional AND gates the speed shifts may be made to occur at any desired set of counts.

Figure 12:
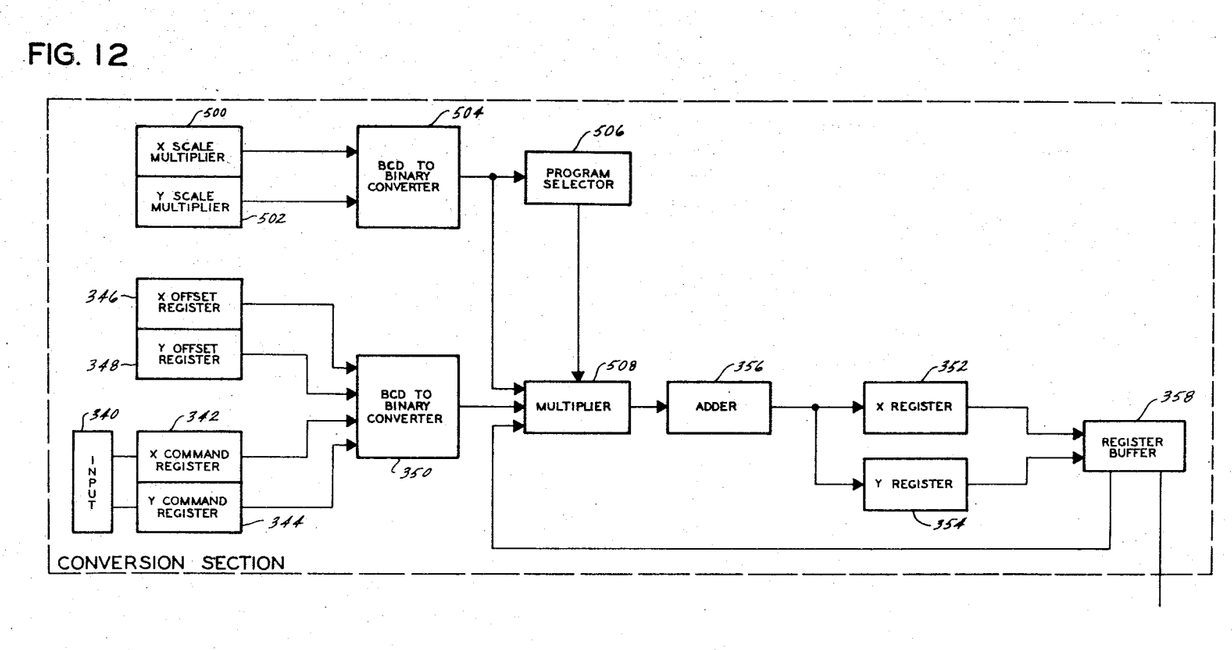
FIG. 12 is a schematic block diagram of the conversion section of an electronic control means for a plotter comprising an alternate embodiment of the invention.

If desired, the above described X–Y plotter may also be provided with means for changing the scale of the resulting plot, and preferably this means is such that the scale factors applied to the X and Y axes may be independently varied. Referring to FIG. 12, this figure shows the conversion section of the control system as modified from that shown in FIG. 10 to include provision for changing the scale factors. The feedback section of the control system (not shown in FIG. 12) is or may be similar to that shown schematically in FIG. 10.

The modified system shown in FIG. 12 includes the addition of two scale multiplier registers 500 and 502 associated with the X and Y axes respectively. These registers may be of a type supplied with information taken from the tape, cards or other input medium, and may also be and are herein considered to be, a series of thumb wheel switches adapted for manual operation. For example, each register may consist of a series of five binary coded decimal switches with a decimal point occurring between the fourth and fifth switch counting from the right to the left. Thereby a scale factor or multiplier as large as 9.9999 or small as 0.0001 may be introduced to each of the scale registers.

The information contained in each of the scale registers 500 to 502 is transmitted to a BCD to binary converter 504, the converter 504 first operating on the information in the X scale register 500 and then on the information in the Y scale register 502 so as to present output information as to the X and Y scale factors at the proper times for utilization in the remainder of the system. For simplicity the BCD to binary converter 504 has been shown to be entirely separate from the converter 350. In actual practice however the converter 350 may comprise part of the converter 504. The output of the converter 504 is supplied both to a program selector 506 and to a multiplier 508. In utilizing the scale multipliers or factors contained in the registers 500 and 502 the desired multiplication may take place either before or after the offset numbers are added to the command numbers. In the case where multiplication occurs before addition, each scale factor is multiplied with the associated command number and the product is then added to the associated offset number and the product is then added to the associated offset number. In the case of addition before multiplication, each offset number is first added to the associated command number and the sum is then multiplied by the associated scale factor. In practice it has been found that neither of these schemes is entirely satisfactory for all scale factors and that it is preferable to have multiplication before addition in cases where the scale factor is less than 1.0000 and to have addition before multiplication in cases where the scale factor is 1.0000 or larger although other arrangements are possible.

To provide for this desired type of utilization of the scale multipliers or factors, the program selector 506 is responsive to the scale factors and operates on the multiplier 508 to cause it and the associated apparatus to perform the multiplication and the addition in the sequence dictated by the sizes of the scale factors. For example, if the X scale factor is less than 1.0000 the program selector 506 causes the multiplier 508, the adder 356 and the associated apparatus to first multiply the binary X command number received from the converter 350 to the binary X scale multiplier received from the converter 504. This product is then added to the binary X offset number supplied to the multiplier 508 by the converter 350. This multiplication of the X command number with the scale factor before the addition of the offset number avoids any scaling down of the offset number and thereby allows the plotting device to retain the ability to locate the plotting axes at any point on the chart sheet. Changing the scale factor therefore does not change the zero location of the plotting axes or change the range of offset available.

If the X scale multiplier or factor is 1.0000 or larger, the program selector 506 operates on the multiplier 508, adder 356 and the associated apparatus to cause the binary X command number supplied by the converter 350 to be added to the binary X offset number supplied by the converter 350. This sum is thereafter multiplied with the binary X scale factor supplied to the multiplier 508 from the converter 504. The effect of this is that the offset is increased by the scale factor. Also, and as a consequence of this, if the offset registers are properly set for one set of scale factors the scale factors may thereafter generally be changed without any necessity for resetting or changing the numbers in the offset registers in order to retain the range of the plot within the bounds of the chart sheet.

The invention claimed is:

1. In a device having an element movable in the X and Y directions over a surface having dimensions in said X and Y directions, the combination comprising means for sensing the present displacement in the X direction of said element from a given reference axis and for producing a digital signal representative of said displacement, means for producing a digital signal representative of the displacement in the X direction and from said reference axis of a desired end point, means for subtracting said two digital signals to produce a digital error signal representative of the X direction of said element from said end point which error signal is in the form of zero or one level signals appearing simultaneously on a plurality of parallel signal lines, said paralle signa ines being divided into at least three groups, the first of said groups containing those signal lines representing the highest possible significant bits of said error signal, the second of said groups containing those signal lines representing the next highest possible significant bits of said error signal, and the third of said groups containing those lines representing the least possible significant bits of said error signal, and drive means responsive to said error signal for moving said element in the X direction and towards said end point at a speed dependent on the magnitude of said digital error signal, said drive means including a plurality of clutches, means for energizing a first one of said clutches when a one level signal appears on any one of the signal lines of said first group, means for energizing a second one of said clutches when a one level signal appears on one of the signal lines of said second group in the absence of a one level signal on any of the lines of said first group, and means for energizing a third one of said clutches in response to the appearance of a one level signal on one of the lines of said third group in the absence of a one level signal on any of the lines of any other of said groups.

2. In a device having an element movable in the X and Y directions over a surface having dimensions in said X and Y directions, the combination comprising means for sensing the present displacement in the X direction of said element from a given reference axis and for producing a digital signal representative of said displacement, means for producing a digital signal representative of the displacement in the X direction and from said reference axis of a desired end point, means for subtracting said two digital signals to produce a digital error signal representative of the displacement in the X direction of said element from said end point which error signal is in the form of zero or one level signals appearing simultaneously on a plurality of parallel signal lines, and drive means responsive to said error signal for moving said element in the X direction and toward said end point at a speed dependent on the magnitude of said digital error signal, said drive means comprising a plurality of OR gates each having as an input thereto a number of said signal lines, said signal lines being assigned to said OR gates in such a manner that those representing the highest possible significant bits of said error signal input to a first one of said OR gates, those representing the next highest possible significant bits of said error signal input to a second one of said OR gates, and those representing the least possible significant bits of said error signal input to a third one of said OR gates, a plurality of clutches each exclusively associated with a respective one of said OR gates, means for energizing the clutch associated with said first OR gate and for maintaining the other of said clutches in a de-energized state when an output signal is produced from said first OR gate, means for energizing clutch associated with said second OR gate and for maintaining the clutches associated with succeeding ones of said OR gates de-energized when an output signal is produced from said second OR gate in the absence of an output signal from said first OR gate, and means for energizing the clutch associated with said third OR gate when an output signal is produced from said third OR gate in the absence of output signals from all other of said OR gates.

3. In a device having an element movable in the X and Y directions over a surface having dimensions in said X and Y directions, the combination comprising means for sensing the present displacement in the X direction of said element from a given reference axis and for producing a digital signal representative of said displacement, means for producing a digital signal representative of the displacement in the X direction and from said reference axis of a desired end point, means for subtracting said two digital signals to produce a digital error signal representative of the displacement in the X direction of said element from said point which error signal is in the form of zero or one level signals appearing simultaneously on a plurality of parallel signal lines, and drive means responsive to said error signal for moving said element in the X direction and toward said point at a speed dependent on the magnitude of said digital error signal, said drive means comprising a plurality of OR gates each having as an input thereto a number of said signal lines, said signal lines being assigned to said OR gates in such a manner that those representing the highest possible significant bits of said error signal input to a first one of said OR gates, those representing the next highest possible significant bits of said error signal input to a second one of said OR gates, and those representing the least possible significant bits of said error signal go to a third one of said OR gates, a plurality of clutches each exclusively associated with a respective one of said OR gates, means for inverting the output signal from said first and second OR gates, a plurality of AND gates each exclusively associated with a respective one of said clutches, means for energizing each clutch in response to an output signal from its associated AND gate, the AND gate for the clutch associated with said first OR gate having as an input the output signal of said first OR gate, the AND gate for the clutch associated with said second OR gate having as inputs thereto the output signal of said second OR gate and the inverted output signal of said first OR gate, and the AND gate for the clutch associated with said third OR gate having as inputs thereto the output signal of said third OR gate and the inverted output signals of said first and second OR gates, and means for repeatedly applying gating signals simultaneously to said AND gates.

4. The combination as set forth in claim 3 further characterized by said means for energizing each clutch in response to an output signal from its associated AND gate including a plurality of flip-flops each exclusively associated with a respective one of said AND gates and connected with such AND gate so as to be switched to a set condition by an output signal from such AND gate, means for repeatedly applying reset signals simultaneously to said flip-flops, and means electrically connecting each of said clutches to a respective one of said flip-flops so as to energize such clutch when its associated flip-flop is in its set condition.

References Cited

UNITED STATES PATENTS

| 2,541,277 | 2/1951 | Omberg et al. | 235—150.27 |
| 2,987,661 | 6/1961 | Schweitz | 318—20.260 |
| 3,064,173 | 11/1962 | Breen et al. | 318—85 XR |
| 3,172,026 | 3/1965 | Schuman | 235—151.11 XR |
| 3,209,221 | 9/1965 | Pugsley et al. | 318—20.31 |

MALCOM A. MORRISON, Primary Examiner

ROBERT W. WEIG, Assistant Examiner

U.S. Cl. X.R

318—18; 346—29

UNITED STATES PATENT OFFICE
CERTIFICATE OF CORRECTION

Patent No. 3,473,009                                October 14, 1969

Heinz Joseph Gerber et al.

It is certified that error appears in the above identified patent and that said Letters Patent are hereby corrected as shown below:

Column 5, line 19, "ofr" should read -- for --; line 66, after "type," insert -- being provided with teeth so that rotation of the output --; line 67, after "screw 136." cancel "being provided with teeth so that rotation of the output"; line 71, "128" should read -- 138 --. Column 9, line 18, "bearing" should read -- bearings --; line 49, "electrical" should read -- electric --. Column 10, line 64, "form" should read -- from --. Column 14, line 35, "drived" should read -- derived --. Column 17, line 2, after "number," insert -- an --; line 14, "similarly" should read -- similar --. Column 18, lines 60 and 61, cancel "and the product is then added to the associated offset number". Column 19, line 45, "paralle signaines" should read -- parallel signal lines --.

Signed and sealed this 26th day of May 1970.

(SEAL)
Attest:

EDWARD M. FLETCHER, JR.                      WILLIAM E. SCHUYLER, JR.
Attesting Officer                                  Commissioner of Patents